(12) United States Patent
Hingst et al.

(10) Patent No.: US 12,083,932 B2
(45) Date of Patent: Sep. 10, 2024

(54) AUTOMATED FRICTION BRAKE ASSISTED VEHICLE STOP

(71) Applicant: GM GLOBAL TECHNOLOGY OPERATIONS LLC, Detroit, MI (US)

(72) Inventors: James Hingst, Canton, MI (US); Jacob M. Knueven, Southfield, MI (US); Felicia Powers, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 17/529,644

(22) Filed: Nov. 18, 2021

(65) Prior Publication Data

US 2023/0150371 A1 May 18, 2023

(51) Int. Cl.
*B60L 7/26* (2006.01)
*B60T 8/171* (2006.01)
*B60T 8/172* (2006.01)

(52) U.S. Cl.
CPC ............... *B60L 7/26* (2013.01); *B60T 8/171* (2013.01); *B60T 8/172* (2013.01); *B60L 2240/12* (2013.01); *B60L 2240/642* (2013.01); *B60L 2250/28* (2013.01); *B60T 2210/20* (2013.01); *B60T 2220/06* (2013.01); *B60T 2250/04* (2013.01); *B60T 2270/604* (2013.01)

(58) Field of Classification Search
None
See application file for complete search history.

(56) References Cited

U.S. PATENT DOCUMENTS

| | | | |
|---|---|---|---|
| 9,246,417 B1 * | 1/2016 | Connolly | H02P 3/14 |
| 9,340,199 B1 * | 5/2016 | Nefcy | B60W 20/00 |
| 11,548,393 B2 * | 1/2023 | Geuß | B60L 15/2009 |
| 2009/0118886 A1 * | 5/2009 | Tamai | B60W 20/11 |
| | | | 701/22 |
| 2009/0118945 A1 * | 5/2009 | Heap | B60W 20/00 |
| | | | 701/55 |
| 2010/0198475 A1 * | 8/2010 | Stolzl | B60W 30/18127 |
| | | | 303/3 |
| 2012/0299367 A1 * | 11/2012 | Ross | B60T 8/4872 |
| | | | 303/3 |
| 2013/0049945 A1 * | 2/2013 | Crombez | B60K 35/00 |
| | | | 340/453 |

(Continued)

*Primary Examiner* — Jonathan M Dager
(74) *Attorney, Agent, or Firm* — Quinn IP Law (57) ABSTRACT

A method of assisting deceleration during a stop of a motor vehicle having a drivetrain including a traction motor, a road wheel operatively connected to the drivetrain, a friction brake configured to decelerate the road wheel, and an electronic controller includes detecting, via the electronic controller, a request to stop the vehicle. The method also includes commanding the traction motor to provide regenerative braking in response to the request to stop the vehicle. The method additionally includes determining a current vehicle operating state. The method also includes determining an amount of brake drag torque to be generated by the friction brake based on the current vehicle operating state. The method further includes commanding an application of the determined amount of the brake drag torque in parallel with the regenerative braking, thereby operating the friction brake as a mechanical drivetrain damper while assisting the regenerative braking to stop the motor vehicle.

14 Claims, 4 Drawing Sheets

(56) References Cited

U.S. PATENT DOCUMENTS

| | | | | |
|---|---|---|---|---|
| 2013/0076113 | A1* | 3/2013 | Pihl | B60W 20/14 |
| | | | | 303/3 |
| 2013/0289809 | A1* | 10/2013 | Treharne | B60L 3/0046 |
| | | | | 180/65.285 |
| 2014/0183933 | A1* | 7/2014 | Kuhlman | F16D 61/00 |
| | | | | 303/3 |
| 2014/0195133 | A1* | 7/2014 | Kato | B60W 20/00 |
| | | | | 701/78 |
| 2014/0330466 | A1* | 11/2014 | Bureau | B60W 30/192 |
| | | | | 903/903 |
| 2015/0066343 | A1* | 3/2015 | Ronning | B60L 7/18 |
| | | | | 701/123 |
| 2015/0191159 | A1* | 7/2015 | Akamine | B60L 7/18 |
| | | | | 701/22 |
| 2015/0202966 | A1* | 7/2015 | Oyama | B60L 3/0046 |
| | | | | 701/22 |
| 2015/0266383 | A1* | 9/2015 | Kidston | B60L 58/12 |
| | | | | 701/70 |
| 2015/0291148 | A1* | 10/2015 | Sakai | B60W 10/184 |
| | | | | 701/22 |
| 2016/0159225 | A1* | 6/2016 | Nakatsu | B60L 15/2009 |
| | | | | 701/70 |
| 2016/0200199 | A1* | 7/2016 | Nakata | B60T 13/586 |
| | | | | 303/3 |
| 2016/0200200 | A1* | 7/2016 | Nakata | B60L 15/2009 |
| | | | | 303/3 |
| 2016/0236672 | A1* | 8/2016 | Yanagida | B60W 10/06 |
| 2017/0072780 | A1* | 3/2017 | White | B60W 10/08 |
| 2017/0166063 | A1* | 6/2017 | Cho | B60T 1/10 |
| 2017/0253244 | A1* | 9/2017 | Doan | B60W 30/18036 |
| 2017/0327104 | A1* | 11/2017 | Miller | B60W 10/08 |
| 2018/0118034 | A1* | 5/2018 | Zenner | F16D 61/00 |
| 2018/0118194 | A1* | 5/2018 | Kuang | B60W 10/08 |
| 2018/0134276 | A1* | 5/2018 | Zhao | B60L 58/12 |
| 2018/0141441 | A1* | 5/2018 | Kim | B60T 8/321 |
| 2018/0141528 | A1* | 5/2018 | Oh | B60W 30/18127 |
| 2018/0141558 | A1* | 5/2018 | Grutter | B60W 10/02 |
| 2018/0202545 | A1* | 7/2018 | Zhao | B60W 10/08 |
| 2018/0215383 | A1* | 8/2018 | Badger | B60W 10/08 |
| 2018/0229714 | A1* | 8/2018 | Mccullough | B60W 30/20 |
| 2018/0251103 | A1* | 9/2018 | Satterthwaite | F16D 66/022 |
| 2018/0319397 | A1* | 11/2018 | Ohta | B60W 10/04 |
| 2018/0326852 | A1* | 11/2018 | Shiozawa | B60L 9/18 |
| 2019/0111790 | A1* | 4/2019 | Crombez | B60T 8/268 |
| 2019/0135244 | A1* | 5/2019 | Shiozawa | B60T 1/10 |
| 2019/0184959 | A1* | 6/2019 | Cao | G06V 40/10 |
| 2019/0193570 | A1* | 6/2019 | Okumura | F16D 61/00 |
| 2019/0359190 | A1* | 11/2019 | Frenzel | B60T 8/173 |
| 2020/0391758 | A1* | 12/2020 | Hill | B60W 30/19 |
| 2021/0079992 | A1* | 3/2021 | Maguire | F16H 48/22 |
| 2021/0086623 | A1* | 3/2021 | Yao | B60W 30/18172 |
| 2021/0221343 | A1* | 7/2021 | Yao | B60T 8/174 |
| 2021/0237583 | A1* | 8/2021 | Huang | F16D 61/00 |
| 2021/0252983 | A1* | 8/2021 | Nahrwold | B60L 58/12 |
| 2022/0080971 | A1* | 3/2022 | Bolger | B60W 30/182 |
| 2022/0097700 | A1* | 3/2022 | Semenov | B60W 50/085 |
| 2022/0227237 | A1* | 7/2022 | Otanez | B60L 15/2009 |
| 2022/0250620 | A1* | 8/2022 | Hu | B60W 10/06 |
| 2023/0241983 | A1* | 8/2023 | Ravichandran | B60L 15/32 |
| | | | | 701/22 |

* cited by examiner

AUTOMATED FRICTION BRAKE ASSISTED VEHICLE STOP

INTRODUCTION

The disclosure relates to an automated friction brake assisted stop in a motor vehicle employing a drivetrain with an electric motor.

Motor vehicles generally employ a powerplant to generate propulsion and braking systems to inhibit the vehicle's motion. A traditional brake is typically a mechanical friction device designed to inhibit motion by converting kinetic energy into heat. Such mechanical braking systems apply a retarding force, typically via specifically adapted frictional elements at the vehicle's rotating axles or wheels, to slow the vehicle.

Friction brakes often include stationary shoes or pads that are lined with friction material and configured to be engaged with a rotating wear surface, such as a rotor or a drum. Common configurations include shoes that contact to rub on the outside of a rotating drum, commonly called a "band brake", a rotating drum with shoes that expand to rub the inside of a drum, commonly called a "drum brake", and pads that pinch a rotating disc, commonly called a "disc brake". Generally, vehicle friction brakes absorb thermal energy and store the energy mainly in the brake disc or brake drum while the brakes are being applied, and then gradually transfer stored heat to the ambient.

Other methods of energy conversion may also be employed. For example, electric or hybrid-electric vehicles using traction motors for propulsion frequently employ regenerative braking, where the traction motor is operated in energy generation mode to retard vehicle motion. Generally, regenerative braking converts much of the vehicle's kinetic energy to electric energy, which may then be stored for later use in onboard batteries. Many modern electric and hybrid-electric vehicles employ braking systems that include a combination of mechanical friction and regenerative braking.

Occasionally, operation of braking systems may be accompanied by noise, vibration, and harshness (NVH) concerns in the host vehicle. In some instances, such NVH concerns may be due to performance characteristics of the mechanical braking system's friction elements. In other situations, NVH concerns may be experienced during transitions between vehicle drive, coast, and braking modes, for example uncovering or exacerbating effects of mechanical lash in the underlying propulsion and/or suspension systems.

SUMMARY

A method of assisting deceleration during a stop of a motor vehicle having a drivetrain including a traction motor, a road wheel operatively connected to the drivetrain, a friction brake configured to decelerate the road wheel, and an electronic controller includes detecting, via the electronic controller, a request to stop the vehicle. The method also includes commanding, via the electronic controller, the traction motor to provide regenerative braking in response to the request to stop the vehicle. The method additionally includes determining, via the electronic controller, a current vehicle operating state. The method also includes determining, via the electronic controller, an amount of brake drag torque to be generated by the friction brake based on the current vehicle operating state. The method further includes commanding, via the electronic controller, an application of the determined amount of the brake drag torque in parallel with the regenerative braking, thereby operating the friction brake as a mechanical drivetrain damper while assisting the regenerative braking to stop the motor vehicle.

According to the method, determining the current vehicle operating state may include determining a current grade of the vehicle.

Additionally, determining the amount of brake drag torque may be accomplished via a first look-up table.

According to the method, determining the current vehicle operating state may include determining a current road speed of the vehicle.

Additionally, commanding the application of the determined amount of the brake drag torque may be accomplished when the current road speed of the vehicle is below a vehicle road speed threshold, such as 3 kph.

The method may also include determining a rate of ramp-up of the brake drag torque based on the current vehicle operating state and the determined amount of the brake drag torque.

According to the method, determining the rate of ramp-up of the brake drag torque may be accomplished via a second look-up table based on the current road speed of the vehicle and the current grade of the vehicle.

Additionally, commanding the application of the determined amount of the brake drag torque may include commanding the rate of ramp-up of the brake drag torque.

The method may also include determining a desired incremental amount of the brake drag torque. Additionally, the method may include determining whether a difference between the desired incremental amount of the brake drag torque and the determined amount of the brake drag torque is greater than a predetermined incremental brake drag torque limit. Furthermore, the method may include commanding the application of the determined amount of the brake drag torque when the difference between the desired incremental amount of the brake drag torque and the determined amount of the brake drag torque is greater than the predetermined incremental brake drag torque limit.

The motor vehicle may include an accelerator switch in communication with the electronic controller. The method may further include monitoring, via the electronic controller, the accelerator switch for a vehicle acceleration request. According to the method, in such an embodiment, commanding the application of the determined amount of the brake drag torque may be accomplished when the vehicle acceleration request has not been detected.

A vehicle having an electronic controller configured or programmed to execute such a method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above," "below," "upward," "downward," "top," "bottom,", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
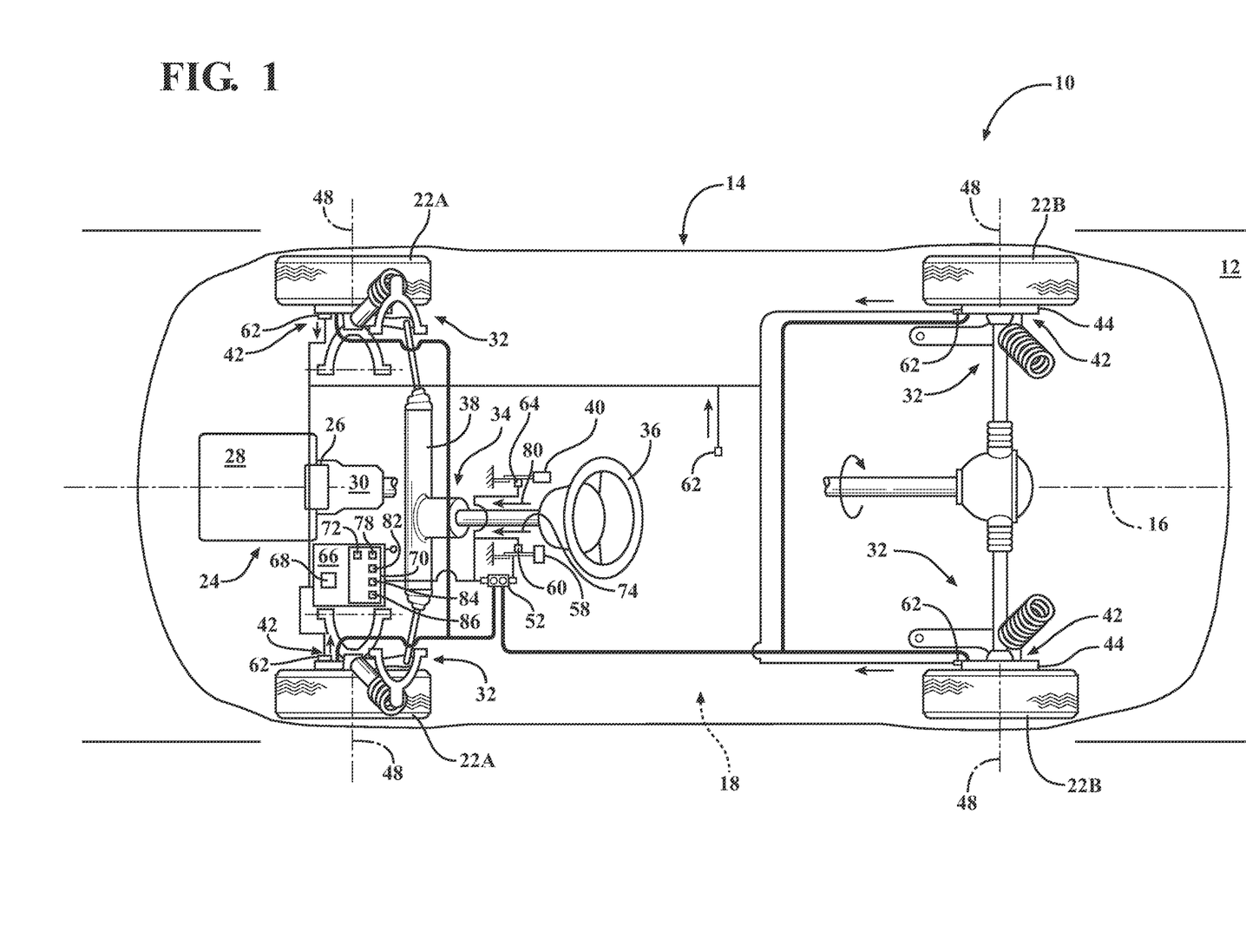
FIG. 1 is a schematic plan view of a motor vehicle having a drivetrain, including a traction motor configured to provide regenerative braking, a friction brake subassembly at each road wheel, and employing a system for assisting vehicle deceleration to a stop using such friction brakes, according to the disclosure.

Referring to the drawings, wherein like reference numbers refer to like components, FIG. 1 shows a schematic view of a motor vehicle 10 positioned relative to a road surface 12. The vehicle 10 may be a mobile platform, such as a passenger vehicle, an all-terrain vehicle (ATV), an airplane, etc., used for personal, commercial, or industrial purpose. As shown, the vehicle 10 includes a vehicle body 14 disposed along a longitudinal axis 16 and having respective left, right, front, and back sides. The vehicle body 14 also defines a vehicle interior 18 configured to accommodate a vehicle operator, passengers, and cargo.

With continued reference to FIG. 1, the vehicle 10 includes a plurality of road wheels, specifically shown as front wheels 22A and rear wheels 22B. The vehicle 10 also includes a drivetrain 24 configured to provide propulsion thereof. The drivetrain 24 includes one or more traction motors or electric motor-generators 26 operatively connected to at least some of the road wheels 22A and 22B and configured to generate motor drive torque $T_m$. As shown, the drivetrain 24 may additionally include an internal combustion engine 28 configured to generate engine drive torque $T_e$ and a transmission 30 operatively connecting the engine to at least some of the road wheels 22A, 22B for transmitting engine torque thereto. The drivetrain 24 may additionally include a fuel cell (not shown) operatively connected to at least some of the road wheels 22A and 22B.

As shown in FIG. 1, a vehicle suspension system 32 operatively connects the body 14 to the respective road wheels 22A and 22B for maintaining contact between the wheels and the road surface 12, and for maintaining handling of the vehicle 10. As also shown in FIG. 1, a vehicle steering system 34 is operatively connected to the front wheels 22A for steering the vehicle 10. The steering system 34 includes a steering wheel 36 that is operatively connected to the front wheels 22A via a steering rack 38. The steering wheel 36 is arranged inside the passenger compartment of the vehicle 10, such that an operator of the vehicle may command the vehicle to assume a particular direction with respect to the road surface 12. Additionally, an accelerator switch or pedal 40 is positioned inside the passenger compartment of the vehicle 10, wherein the accelerator switch is operatively connected to the drivetrain 24 for commanding propulsion of the vehicle 10.

A vehicle braking system 42 is operatively connected to the respective front and rear wheels 22A, 22B for retarding rotation of the wheels and decelerating the vehicle 10. The braking system 42 includes a friction brake subassembly, or friction brake, 44 arranged at each of the respective front and rear wheels 22A, 22B and operatively connected to the vehicle suspension system 32. In other words, the braking system 42 may include a plurality of friction brake subassemblies 44. Each brake subassembly 44 may be configured as either a disc brake (shown in FIG. 2) or a drum brake (shown in FIG. 3). Each brake subassembly 44 includes a rotor 46 configured for synchronous rotation with the respective wheel 22A or 22B about a wheel axis 48. Each brake subassembly 44 additionally includes an actuator 50 arranged in a brake caliper 50-1 of a disc brake (shown in FIG. 2) or in a foundation 50-2 of a drum brake (shown in FIG. 3), and configured to generate an actuator or brake force F. The actuator 50 may be configured as a hydraulically actuated piston, e.g., operated via hydraulic brake pressure P generated at a master brake cylinder 52, or an electrically actuated servo-motor (not shown).

Figure 2:
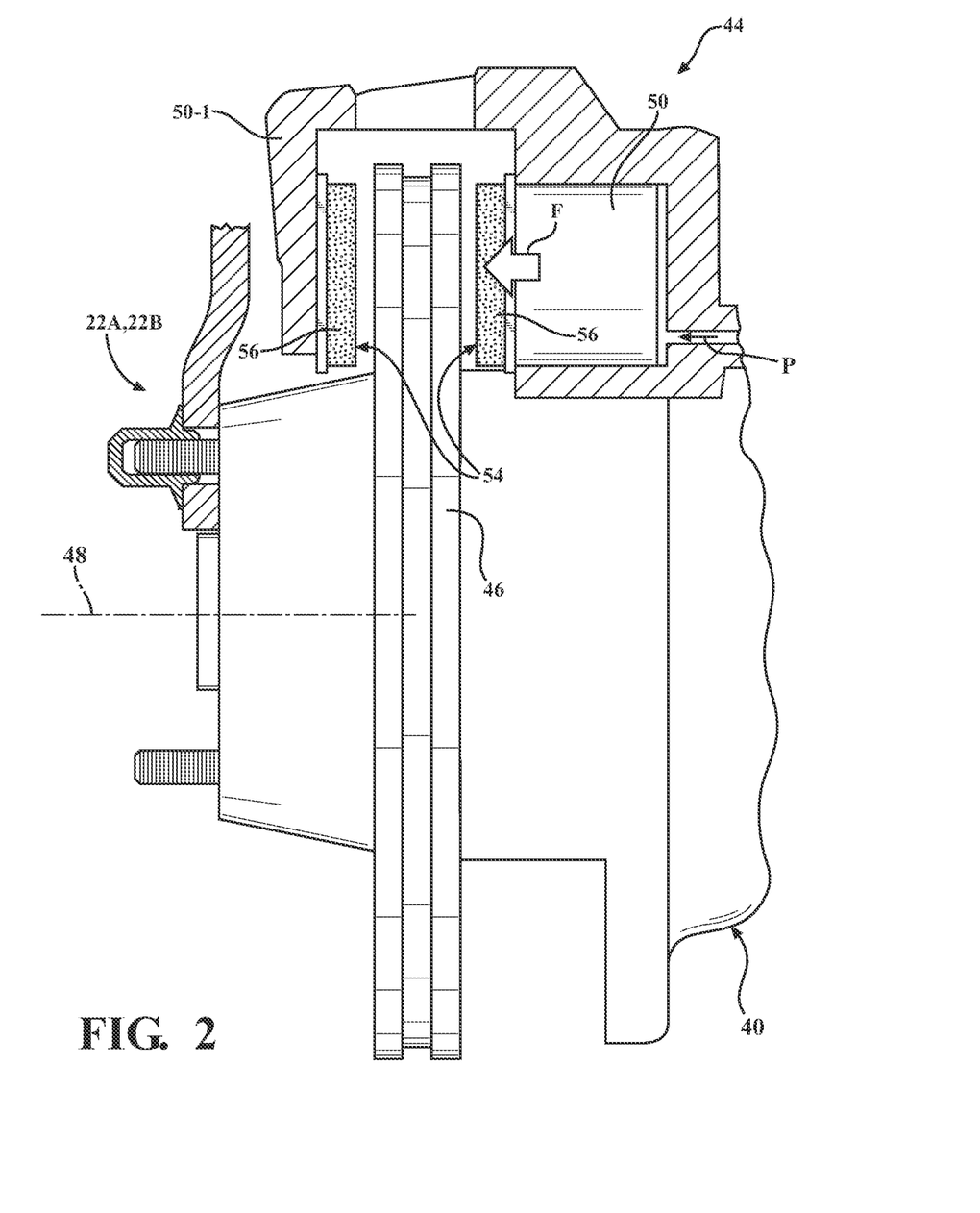
FIG. 2 is a schematic cross-sectional view of a disc brake embodiment of the brake subassembly shown in FIG. 1, wherein the brake subassembly is configured as a disc brake.
Figure 3:
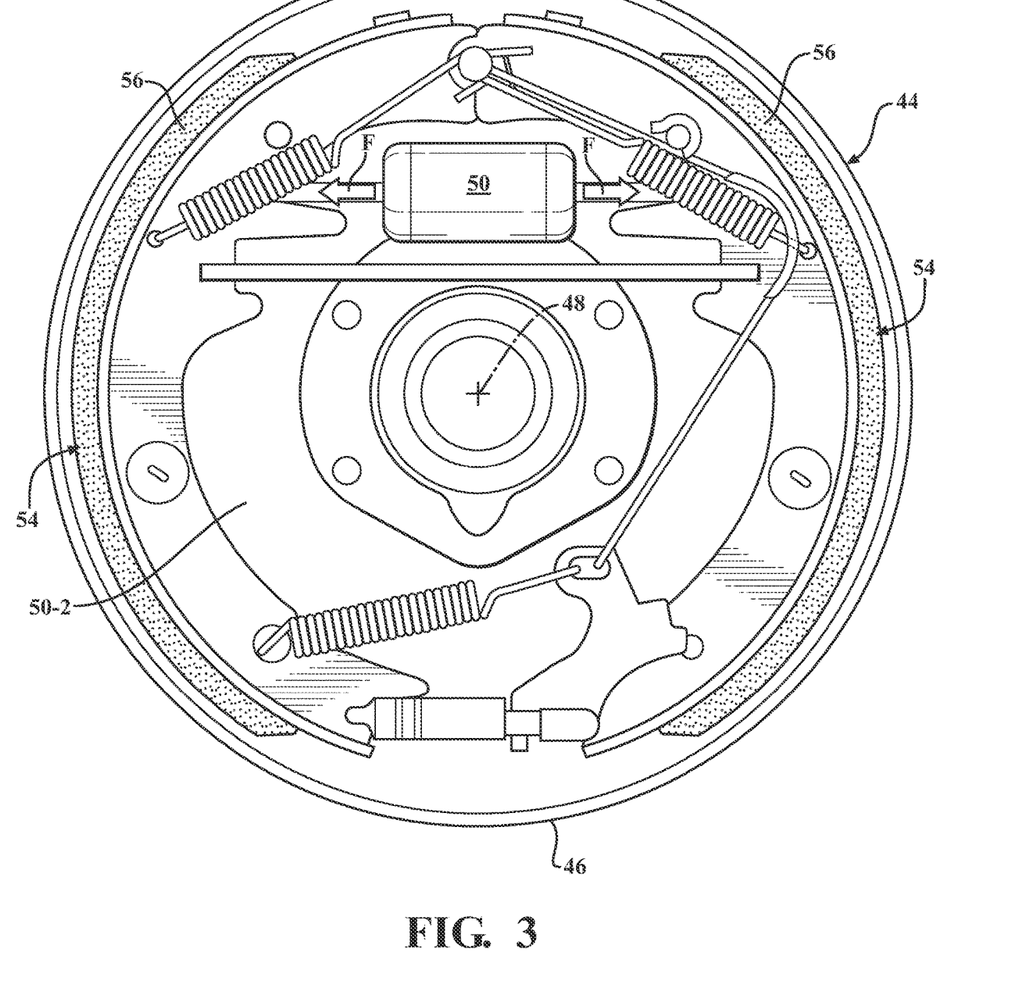
FIG. 3 is a schematic side view of a drum brake embodiment of the brake subassembly shown in FIG. 1.

As shown in FIGS. 2 and 3, each brake subassembly 44 also includes one or more brake components or pads 54, each having a wearable friction lining or element 56. The friction lining 56 is configured to be pressed into contact with the rotor 46 by the actuator force F for retarding rotation of the respective wheel 22A or 22B to decelerate the vehicle 10. The actuator force F may be controlled via a signal generated by a brake switch or pedal 58 and communicated electronically to the master brake cylinder 52 (shown in FIG. 1). The brake switch 58 is generally positioned inside the passenger compartment of the interior 18, and is adapted to be controlled by the operator of the vehicle 10.

With reference to FIG. 1, the vehicle 10 also includes a first sensor 60 configured to detect a deceleration request to stop the vehicle 10, such as via an application of the brake switch 58 or a vehicle-based request for a stop without a driver-initiated deceleration request. The vehicle 10 further includes one or more second sensors 62 configured to detect an operating state of the vehicle 10, such as the vehicle road speed (V) and a grade or inclination (G) of the vehicle. Additionally, the vehicle 10 includes a third sensor 64 configured to detect a vehicle acceleration request, such as via an application of the accelerator switch 40. The actuator force F may be controlled via the brake switch 58 to provide sufficient torque at the respective wheel 22A or 22B to bring the vehicle 10 to a stop, some drag torque $T_d$ via light contact between the friction lining(s) 56 and the rotor 46 to generate nominal or trace retardation of wheel rotation, and various magnitudes of the actuator force in between to decelerate the vehicle at a desired rate.

Alternatively, the actuator force F may be similarly controlled via an on-board vehicle electronic controller 66 as part of a system for assisting vehicle deceleration to a stop using the friction brake(s) 44. As shown in FIG. 1, the electronic controller 66 is in communication with the sensors 60 and 62. The electronic controller 66 may alternatively be referred to as a control module, a control unit, a controller, a vehicle 10 controller, a computer, etc. The electronic controller 66 may include a computer and/or processor 68, and include software, hardware, memory, algorithms, connections (such as to sensors 60 and 62), etc., for managing and controlling the operation of the vehicle 10. As such, a method, described in detail below and generally represented in FIG. 4, may be embodied as a program or algorithm operable on the electronic controller 66. It should be appreciated that the electronic controller 66 may include a device capable of analyzing data from the sensors 60 and 62, comparing data, making the decisions required to control the operation of the vehicle 10, and executing the required tasks to control the operation of the subject vehicle.

The electronic controller 66 may be embodied as one or multiple digital computers or host machines each having one or more processors 68, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a floppy, flexible disk, or hard disk, magnetic tape or other magnetic medium, a CD-ROM, DVD, and/or other optical medium, as well as other possible memory devices such as flash memory.

The electronic controller 66 also includes a tangible, non-transitory memory 70 on which are recorded computer-executable instructions, including one or more algorithms, for regulating operation of the motor vehicle 10. Algorithms required by the controller 66 or accessible thereby may be stored in the memory and automatically executed to provide the required functionality. The subject algorithm(s) may specifically include an algorithm 72 for assisting a stop of the motor vehicle 10 to be described in detail below. The processor 68 of the electronic controller 66 is configured to execute the algorithm 72. The electronic controller 66 is further configured to command an application of friction brake 44 drag torque ($T_d$) to thereby operate as a mechanical vehicle drivetrain damper to address noise, vibration, and harshness (NVH) concerns during a regenerative braking vehicle stop.

Typically, mechanical systems, such as the drivetrain 24 and suspension 32 of the vehicle 10, have clearance or lost motion, a.k.a., backlash or lash, caused by clearance between system components. Such lash may be defined as the maximum distance or angle through which some part of a mechanical system may be moved in one direction without applying appreciable force or motion to the next part in mechanical sequence. An example of lash in the context of gears and geartrains is the amount of clearance between mated gear teeth. Gear lash may be seen when the direction of geartrain movement is reversed and the slack or lost motion is taken up before the reversal of motion is complete. Variations in lash in mechanical linkages may be due to allowances for lubrication, manufacturing tolerances, deflection under load, and thermal contraction/expansion. Additionally, in many mechanical systems some backlash is allowed specifically to prevent jamming. Backlash in drivetrain 24 and suspension 32 of the vehicle 10 may be exposed under operation of the braking system 42, and generate NVH concerns, such as bumping and clunking. Such, NVH concerns may be experienced during transitions between vehicle drive, coast, and braking modes. Additional NVH concerns, such as creaking, may be experienced due to performance characteristics of the friction element(s) 56.

Specifically, the electronic controller 66 is configured to detect, using the first sensor 60, a request 74 to stop the vehicle 10. The electronic controller 66 is also configured to command the traction motor 26 to provide regenerative braking in response to the request 74 to stop the vehicle 10. The electronic controller 66 is additionally configured to determine, using the second vehicle sensor(s) 62, a current vehicle operating state, such as current vehicle road speed (V) and current vehicle grade (G). The electronic controller 66 is also configured to determine an amount of brake drag torque ($T_d$) to be generated by the friction brake 44 based on the current vehicle operating state. The electronic controller 66 is further configured to command an application of the determined amount of the brake drag torque ($T_d$) in parallel with the regenerative braking, to thereby generate friction damping via the friction brake 44, while assisting the regenerative braking to stop the vehicle 10. Specifically, the algorithm 72 may compare the current road speed (V) to a vehicle road speed threshold 78, such as 3 kph.

The electronic controller 66 may be configured to then command application of the determined amount of the brake drag torque ($T_d$) when the current road speed (V) of the vehicle 10 is below the road speed threshold 78. The electronic controller 66 may be additionally configured to monitor the accelerator switch 40 for a vehicle acceleration request 80 and command application of the determined amount of the brake drag torque ($T_d$) when the vehicle acceleration request has not been detected. The electronic controller 66 may be also configured to determine the amount of brake drag torque ($T_d$) via a first look-up table 82 saved into the controller's memory. The first look-up table 82 may include data of brake drag torque ($T_d$) versus the vehicle grade (G) empirically developed on a representative vehicle under controlled test conditions.

The electronic controller 66 may be additionally configured to determine a rate of ramp-up of the brake drag torque ($T_d'$) based on the current vehicle operating state, such as the current road speed (V) and grade (G) of the vehicle 10, and the determined amount of the brake drag torque ($T_d$). Accordingly, the electronic controller 66 may command the determined rate of ramp-up of the brake drag torque ($T_d'$) during application of the determined amount of the brake drag torque ($T_d$). The electronic controller 66 may be specifically configured to determine the rate of ramp-up of the brake drag torque ($T_d'$) via a second look-up table 84 saved into the controller's memory. The second look-up table 84 may include data of ramp-up of the brake drag torque ($T_d'$) versus the empirically developed vehicle road speed (V) and grade (G). Data from the first look-up table 82 may be specifically employed as an input to the second look-up table 84.

In a particular embodiment, the electronic controller 66 may be configured to determine a desired incremental amount of the brake drag torque ($\Delta T_d$) based on the determined amount of the brake drag torque ($T_d$) and the determined rate of ramp-up of the brake drag torque ($T_d'$). In such an embodiment, the electronic controller 66 may be additionally configured to determine whether a difference between the desired incremental amount of the brake drag torque ($\Delta T_d$) and the determined amount of the brake drag torque ($T_d$) is greater than a predetermined incremental brake drag torque limit 86. The electronic controller 66 may be configured to then command the application of the determined amount of the brake drag torque ($T_d$) when the difference between the desired incremental amount of the brake drag torque ($\Delta T_d$) and the determined amount of the brake drag torque ($T_d$) is greater than the predetermined incremental brake drag torque limit 86.

The electronic controller 66 may be further programmed to fully engage the friction brake(s) 44 once the vehicle 10 has come to a complete stop and the regenerative braking is no longer active. Accordingly, the electronic controller 66 is intended to regulate application of the friction brake(s) 44 to apply the drag torque ($T_d$) and thereby generate vehicle driveline hysteresis during vehicle deceleration while coming to a stop. The hysteresis provided by the drag torque ($T_d$) is thereby intended to operate as a mechanical or friction damper to minimize NVH issues due to driveline lash during a regenerative braking vehicle stop. Additionally, the vehicle driveline hysteresis provided by the drag torque ($T_d$) during the latter stages of vehicle deceleration permits a smooth and uninterrupted transition to a brake-held stationary vehicle 10.

Figure 4:
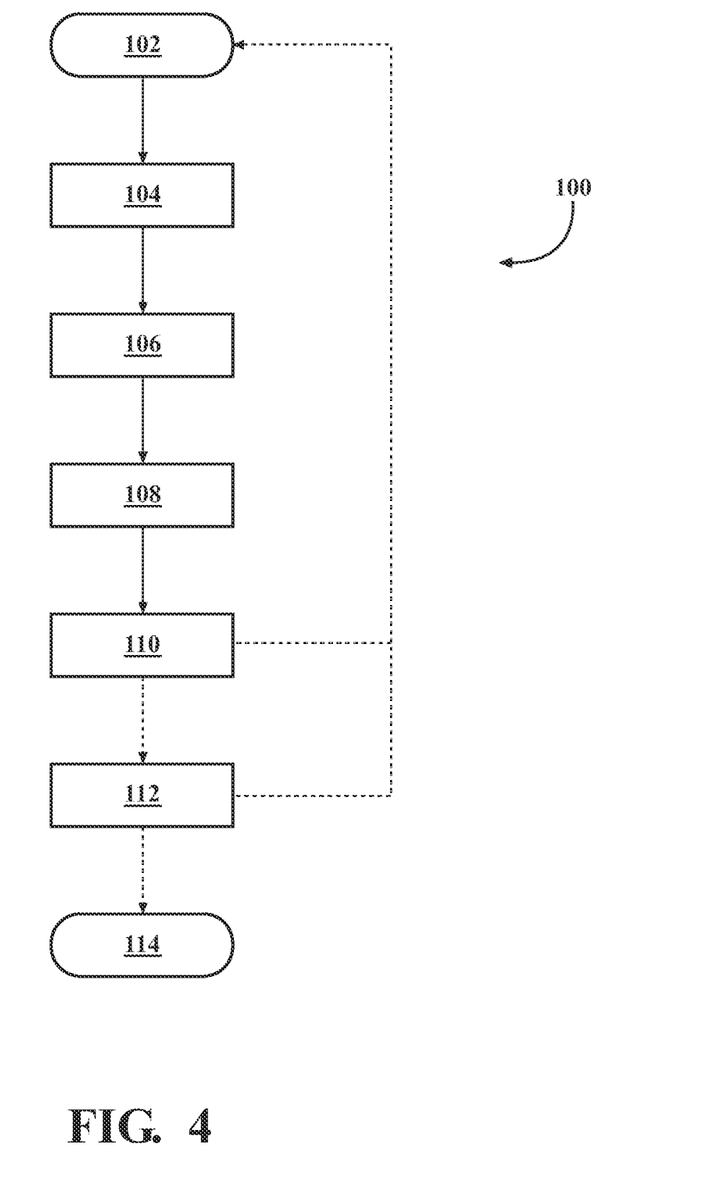
FIG. 4 is a flow diagram of a method for assisting deceleration to a stop of a motor vehicle, such as depicted in FIGS. 1-3.

FIG. 4 depicts a method 100 of assisting deceleration of a motor vehicle, such as the vehicle 10 described above with respect to FIGS. 1-3, during the vehicle's stop. The method 100 commences in frame 102 with detecting movement of the vehicle 10 relative to the road surface 12. In frame 102 the method may also include detecting via the controller 66, such as using the first sensor 60, the request 74 to stop the vehicle 10. The method 100 then proceeds from frame 102 to frame 104. In frame 104, the method includes commanding, via the electronic controller 66, the traction motor 26 to provide regenerative braking in response to the request 74 to stop the vehicle 10. The method 100 then proceeds from frame 104 to frame 106. In frame 106, the method includes determining via the electronic controller 66 the current vehicle operating state, such as by using the second vehicle sensor(s) 62 to detect the current vehicle road speed (V) and current vehicle grade (G). Following frame 106, the method 100 advances to frame 108.

In frame 108 the method 100 includes determining, via the electronic controller 66, the amount of brake drag torque ($T_d$) to be generated by the friction brake(s) 44 based on the current vehicle operating state. Determining the amount of brake drag torque ($T_d$) may be accomplished via the first look-up table 82 having data of brake drag torque ($T_d$) versus the vehicle grade (G). In frame 108 the method 100 may also include determining, via the electronic controller 66, a particular rate of ramp-up of the brake drag torque ($T_d'$) based on the current vehicle operating state and the determined amount of the brake drag torque ($T_d$). Determining the rate of ramp-up of the brake drag torque ($T_d$) may be accomplished via the second look-up table 84 having data of ramp-up of the brake drag torque ($T_d'$) versus the vehicle road speed (V) and grade (G).

In frame 108 the method 100 may additionally include determining, via the electronic controller 66, a particular desired incremental amount of the brake drag torque ($\Delta T_d$) based on the determined amount of the brake drag torque ($T_d$) and the determined rate of ramp-up of the brake drag torque ($T_d'$). As described above with respect to FIGS. 1-3, in such an embodiment the method may further include determining, via the electronic controller 66, whether the difference between the desired incremental amount of the brake drag torque ($\Delta T_d$) and the determined amount of the brake drag torque ($T_d$) is greater than the predetermined incremental brake drag torque limit 86. After frame 108, the method 100 proceeds to frame 110.

In frame 110, the method 100 includes commanding via the electronic controller 66 the application of the determined amount of the brake drag torque ($T_d$) in parallel with the regenerative braking. Specifically, commanding the application of the determined amount of the brake drag torque ($T_d$) may be accomplished when the current road speed (V) of the vehicle 10 is below a particular vehicle road speed threshold 78. Also, commanding the application of the determined amount of the brake drag torque ($T_d$) may include commanding the rate of ramp-up of the brake drag torque ($T_d'$). Additionally, commanding the application of the determined amount of the brake drag torque ($T_d$) may be accomplished when the difference between the desired incremental amount of the brake drag torque ($\Delta T_d$) and the determined amount of the brake drag torque ($T_d$) is greater than the predetermined incremental brake drag torque limit 86. Furthermore, commanding the application of the determined amount of the brake drag torque ($T_d$) in frame 110 may be accomplished when the vehicle acceleration request 80 has not been detected. Otherwise, the method may loop back to frame 102.

As described above with respect to FIGS. 1-3, the commanded brake drag torque ($T_d$) operates the friction brake(s) 44 as a mechanical drivetrain damper to minimize NVH concerns, while assisting the regenerative braking to stop the motor vehicle 10. The method may proceed from frame 110 to frame 112 where the electronic controller 66 includes commanding the friction brake(s) 44 to fully engage once the vehicle 10 has come to a complete stop and the regenerative braking is no longer active. Following a complete vehicle stop, the method may restart in frame 102 with detecting resumed movement of the vehicle 10 relative to the road surface 12, thus enabling repetition of the method algorithm in frames 102 through 112 for assisting regenerative braking to stop the motor vehicle 10 while minimizing NVH concerns. The method 100 may also terminate at frame 114. Accordingly, with respect to the method 100, regenerative braking and brake drag torque ($T_d$) are employed to achieve different goals. Regenerative braking is primarily used to bring the vehicle 10 to a stop, while brake drag torque ($T_d$) is used to target NVH/driveline issues.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of assisting deceleration during a stop of a motor vehicle having a drivetrain including a traction motor, a road wheel operatively connected to the drivetrain, a friction brake configured to decelerate the road wheel, and an electronic controller, the method comprising:

detecting, via the electronic controller, a request to stop the vehicle;

commanding, via the electronic controller, the traction motor to provide regenerative braking in response to the request to stop the vehicle;

determining, via the electronic controller, a current vehicle operating state, including determining a current grade of the vehicle and a current road speed of the vehicle;

determining, via the electronic controller, an amount of brake drag torque to be generated by the friction brake based on the current vehicle operating state;

determining a rate of ramp-up of the brake drag torque based on the current vehicle operating state and the determined amount of the brake drag torque;

commanding, via the electronic controller, an application of the determined amount of the brake drag torque in parallel with the regenerative braking; and operating, via the electronic controller, the friction brake as a mechanical drivetrain damper while assisting the regenerative braking to stop the motor vehicle.

2. The method according to claim 1, wherein determining the amount of brake drag torque is accomplished via a first look-up table.

3. The method according to claim 1, wherein commanding the application of the determined amount of the brake drag torque is accomplished when the current road speed of the vehicle is below a vehicle road speed threshold.

4. The method according to claim 1, wherein determining the rate of ramp-up of the brake drag torque is accomplished via a second look-up table based on the current road speed of the vehicle and the current grade of the vehicle.

5. The method according to claim 1, wherein commanding the application of the determined amount of the brake drag torque includes commanding the rate of ramp-up of the brake drag torque.

6. The method according to claim 1, further comprising:
determining a desired incremental amount of the brake drag torque;
determining whether a difference between the desired incremental amount of the brake drag torque and the determined amount of the brake drag torque is greater than a predetermined incremental brake drag torque limit; and
commanding the application of the determined amount of the brake drag torque when the difference between the desired incremental amount of the brake drag torque and the determined amount of the brake drag torque is greater than the predetermined incremental brake drag torque limit.

7. The method according to claim 1, wherein the motor vehicle includes an accelerator switch in communication with the electronic controller, the method further comprising monitoring, via the electronic controller, the accelerator switch for a vehicle acceleration request, and wherein commanding the application of the determined amount of the brake drag torque is accomplished when the vehicle acceleration request has not been detected.

8. A motor vehicle comprising:
a drivetrain including a traction motor;
a road wheel operatively connected to the drivetrain;
a friction brake configured to decelerate the road wheel;
a first sensor configured to detect a request to stop the vehicle;
a second sensor configured to detect a current vehicle operating state; and
an electronic controller in communication with each of the first and second sensors and configured to:
detect, via the first sensor, the request to stop the vehicle;
command the traction motor to provide regenerative braking in response to the request to stop the vehicle;
determine, via the second sensor, the current vehicle operating state, including via determination of a current grade of the vehicle and a current road speed of the vehicle;
determine an amount of brake drag torque to be generated by the friction brake based on the current vehicle operating state;

determine a rate of ramp-up of the brake drag torque based on the current vehicle operating state and the determined amount of the brake drag torque;

command an application of the determined amount of the brake drag torque in parallel with the regenerative braking; and operate the friction brake as a mechanical drivetrain damper while assisting the regenerative braking to stop the motor vehicle.

9. The motor vehicle according to claim 8, wherein the electronic controller is configured to command the application of the determined amount of the brake drag torque when the current road speed of the vehicle is below a vehicle road speed threshold.

10. The motor vehicle according to claim 8, wherein the electronic controller is configured to determine the rate of ramp-up of the brake drag torque via a second look-up table based on the current road speed of the vehicle and the current grade of the vehicle.

11. The motor vehicle according to claim 8, wherein, to command the application of the determined amount of the brake drag torque, the electronic controller is configured to command the rate of ramp-up of the brake drag torque.

12. The motor vehicle according to claim 8, wherein the electronic controller is additionally configured to:
determine a desired incremental amount of the brake drag torque;
determine whether a difference between the desired incremental amount of the brake drag torque and the determined amount of the brake drag torque is greater than a predetermined incremental brake drag torque limit; and
command the application of the determined amount of the brake drag torque when the difference between the desired incremental amount of the brake drag torque and the determined amount of the brake drag torque is greater than the predetermined incremental brake drag torque limit.

13. The motor vehicle according to claim 8, further comprising an accelerator switch in communication with the electronic controller, wherein the electronic controller is additionally configured to:
monitor the accelerator switch for a vehicle acceleration request; and
command the application of the determined amount of the brake drag torque when the vehicle acceleration request has not been detected.

14. A motor vehicle comprising:
a drivetrain including a traction motor;
a road wheel operatively connected to the drivetrain;
a friction brake configured to decelerate the road wheel;
a first sensor configured to detect a request to stop the vehicle;
a second sensor configured to detect a current vehicle operating state; and
an electronic controller in communication with each of the first and second sensors and configured to:
detect, via the first sensor, the request to stop the vehicle;
command the traction motor to provide regenerative braking in response to the request to stop the vehicle;
determine, via the second sensor, the current vehicle operating state;
determine an amount of brake drag torque to be generated by the friction brake based on the current vehicle operating state;

determine a desired incremental amount of the brake drag torque;

determine whether a difference between the desired incremental amount of the brake drag torque and the determined amount of the brake drag torque is greater than a predetermined incremental brake drag torque limit; and command an application of the determined amount of the brake drag torque in parallel with the regenerative braking when the difference between the desired incremental amount of the brake drag torque and the determined amount of the brake drag torque is greater than the predetermined incremental brake drag torque limit, to thereby operate the friction brake as a mechanical drivetrain damper while assisting the regenerative braking to stop the motor vehicle.

\* \* \* \* \*